United States Patent [19]

Branham, Sr. et al.

[11] Patent Number: 5,142,832

[45] Date of Patent: Sep. 1, 1992

[54] WALL MOUNTING SYSTEM

[75] Inventors: William K. Branham, Sr.; William K. Branham, II, both of Louisville, Ky.

[73] Assignee: Bill Branham Designs, Ltd., Louisville, Ky.

[21] Appl. No.: 583,964

[22] Filed: Sep. 14, 1990

[51] Int. Cl.$^5$ .............................................. E04B 1/00
[52] U.S. Cl. ........................................ 52/36; 211/87; 248/323; 248/343; 52/745
[58] Field of Search ............... 52/36, 38, 710, 745; 211/87, 94, 187, 189; 248/220.2, 220.3, 225.1, 225.2, 323, 343

[56] References Cited

U.S. PATENT DOCUMENTS

| | | | |
|---|---|---|---|
| 751,321 | 2/1904 | Miller | 248/323 |
| 950,771 | 3/1910 | Lohmann | 52/710 |
| 1,350,964 | 8/1920 | Friel | 52/710 |
| 2,079,478 | 5/1937 | Bashe | 52/710 |
| 2,733,330 | 1/1956 | Blewett | 258/297.1 |
| 2,736,527 | 2/1956 | Maier | 248/297.2 |
| 2,754,166 | 10/1956 | Ohm | 211/95 |
| 2,784,812 | 3/1957 | Kindorf | 401/222 |
| 2,931,853 | 4/1960 | Wilson | 248/297.5 |
| 2,953,874 | 9/1960 | Kindorf | 52/709 |
| 3,246,074 | 4/1966 | Neumann et al. | 248/343 |
| 4,161,303 | 7/1979 | Bachland | 248/246 |
| 4,253,633 | 3/1981 | Takegawa | 248/222.3 |
| 4,443,979 | 4/1984 | Varan et al. | 52/36 |
| 4,450,655 | 5/1984 | Rosenthal et al. | 52/36 |
| 4,523,683 | 6/1985 | Fullenhamp et al. | 211/190 |
| 4,531,331 | 7/1985 | Itagaki | 52/38 |
| 4,560,130 | 12/1985 | Schwartz | 248/297.2 |
| 4,602,756 | 7/1986 | Chatfield | 248/225.1 |
| 4,645,374 | 2/1987 | Erickson | 52/282 |
| 4,677,794 | 7/1987 | Parron et al. | 52/36 |
| 4,718,562 | 1/1988 | Winkler | 211/87 |
| 4,903,928 | 2/1990 | Shell | 248/225.1 |

FOREIGN PATENT DOCUMENTS

| | | | |
|---|---|---|---|
| 1183878 | 2/1959 | France | 211/103 |
| 21629 | 10/1906 | United Kingdom | 52/710 |
| 751485 | 6/1956 | United Kingdom | 248/222.1 |

OTHER PUBLICATIONS

"Marhite ® Brand Displawall TM and other visual merchandising Products" Brochure, 12 pages).
Masonite Corporation, Commericial Division, Dover, Ohio, 44622 "SuperTrax" Brochure, 4 pages).
4509 Stonegate, Ind. Blvd., Stone Mountain, GA. 30086.

Primary Examiner—James L. Ridgill, Jr.

[57] ABSTRACT

A mounting system which comprises a mounting panel and mounting assembly secured thereto utilizes mounting panels having slots of a particular configuration. The slots have a flat rear wall, an arcuate shaped front wall which is bisected to form an entrance means to the exterior surface. A mounting assembly has an arcuate based clamping member complementary to the arcuate configuration of the front wall of the pocket portion of said slot. This arcuate shaped clamping member has a threaded hole in the center portion of said clamping member for provision of a threaded stud which is fitted into said threaded hole through the entrance means and which engages with the rear wall of the pocket. Turning of the threaded stud selectively moves the clamping member in and out of engagement with the front wall of said pocket. This then allows for provision of large diameter studs utilized as a mounting member for lighting fixtures throughout the industry or for smaller threaded members for other uses.

12 Claims, 4 Drawing Sheets

WALL MOUNTING SYSTEM

BACKGROUND OF THE INVENTION

This invention relates to a mounting system utilized with slotted wall board panels known in the trade as SLATWALL. Several brands of slotted wall board panels are on the market, chief among these are the DISPLAYWALL which is produced under the MARLITE brand produced and manufactured by the Masonite Corporation. A new wall system recently introduced by Spacewall International to the market is called SUPERTRAX, in which the slots are vertically arranged rather than horizontally arranged as is standard with DISPLAYWALL wall board.

FIELD OF THE INVENTION

The field of this invention is directed to the use of novel and unique mounting accessories which may be used with the slotted wall board of a special design. DISPLAYWALL had used hooks or hangers of the pegboard variety which were gravitationally operable when the connecting piece was inserted into the slot. If the slots are vertically arranged it becomes necessary to secure the anchoring and mounting assembly into the slots to prevent movement vertically. SUPERTRAX therefore utilizes a bar and tension wheel design in which the bar is inserted into the channel of the slot and turned to align the bracket with the track. Thereafter the tension wheel is adjusted by hand or with a small leverage bar to clamp the keeper bar against the front wall of the slot portion. In order to accomplish this, it was necessary to utilize a force distribution plate on the exterior surface of the wall board which was threaded to allow the keeper bar to be pulled into clamping engagement with the front wall of the slot.

DESCRIPTION OF THE RELATED ART

Applicant is aware of the following art:

"MARLITE Brand Displaywall and Other Visual Merchandising Products," (a twelve page brochure) published by the Commercial Division of Masonite Corporation, Dover, Ohio 44622, date Dec. 1, 1984;

"SUPERTRAX" by Spacewall International, 1976 William Street, San Leandro, Calif. 94577.

The Spacewall system is also described in the following patents:

| U.S. Pat. No. | INVENTOR | DATE |
| --- | --- | --- |
| 4,450,655 | Rosenthal, et. al. | 1984 |
| 4,677,794 | Parron, et. al. | 1987 |

Other pertinent patents and publications are included in the information disclosure statement filed by applicant herewith and which is incorporated herein by reference.

SUMMARY OF THE INVENTION

According to this invention a specialized slot is utilized having an interior pocket portion bounded by a rear wall, a front wall and an entrance means bisecting said front wall. The front wall extends forwardly from the edges of said rear wall in an arcuate configuration and terminates in lip-like portions forming the edge of the entrance means. The mounting assembly comprises two parts. The first is an arcuate shaped clamping member which is complementary to the arcuate configuration of the front wall of the pocket portion of the slot. The width of the clamping member is less than the width of the entrance means and the length is greater than the width of the slot. A threaded hole is tapped in the center portion of the clamping member. A threaded stud is fitted in the threaded hole of the clamping member and turns the clamping member transversely to the long axis of the slot so that the arcuate member registers with the arcuate surface of the front wall of the slot. Turning of the threaded stud until the end touches the rear wall of the pocket portion of the slot pushes the arcuate clamping member forwardly into engagement with the front wall of the slot. The threaded stud projects forwardly through the entrance means for attachment to an item which is to be mounted on the slotted wall panel.

DETAILED DESCRIPTION OF THE PREFERRED EMBODIMENT

This invention was originally directed to the mounting of lighting fixtures for display in a retail establishment. However, the invention has many other applications which will now be described.

Figure 1:
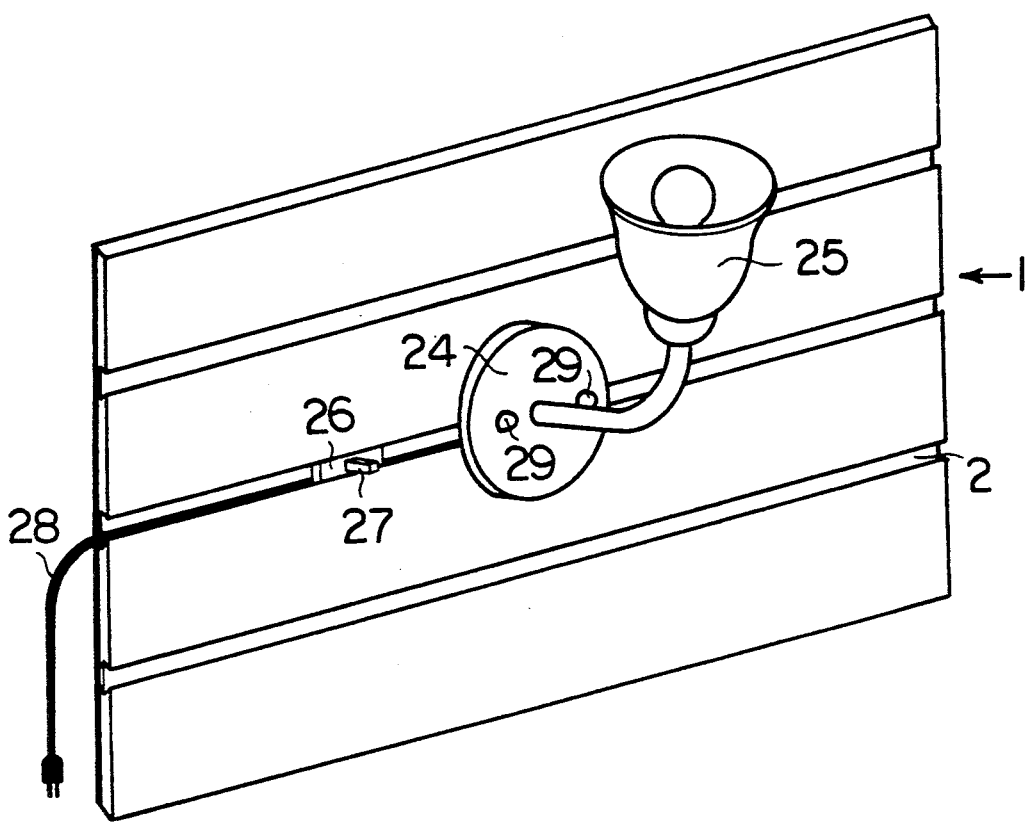
FIG. 1 is a view in perspective of the mounting panel and mounting assembly of this invention in use for mounting light fixtures for display.

Referring to FIG. 1, the display panel 1 contains a mounting slot 2 which is shown in horizontal relation one to the other. A lighting fixture 25 is mounted thereon by means of the mounting plate 24 with the mounting plate nuts 29 secured to the threaded shaft 10 not shown. As is illustrated in FIG. 1, the lighting fixture 25 is electrically connected to wire 28 which is controlled by a switch 26 mounted in slot 2 with a switch button 27. It is possible therefore to mount these lighting fixtures in series so that an entire line of fixtures can be controlled by a single switch 26 through the switch lever 27.

The structure of the slot 2 is somewhat novel in that the pocket portion 7 is bounded by the rear wall 3 and the front wall 4. The front wall projects forwardly in an arcuate or curved fashion and terminates in lips 5 forming the side walls of the entrance means 6.

Figures 2, 3:
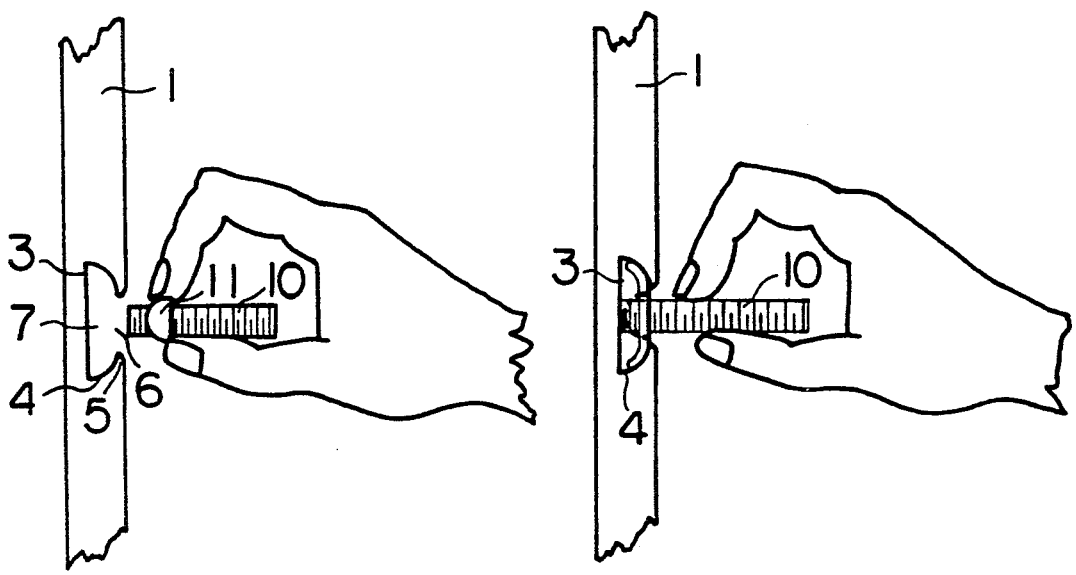
FIG. 2 is a fragmentary sectional view illustrating the clamping bracket of said mounting assembly turned for insertion into the entranceway means of said slot.
FIG. 3 illustrates the threaded stud being secured through the clamping member and in contact with the rear wall of said slot.

FIGS. 2-3 illustrate the installation of the mounting accessory comprising the threaded stud 10 and the base clamping member 11. The base clamping member 11 contains a central threaded hole 12, a top bridge portion 13 and curved portions 14 forming the arcuate shape which terminates at the ends 15 of the member. The threaded stud 10 which is illustrated is conventional in the lighting display industry for mounting of lighting fixtures and is known as a ⅛ nipple since it is hollow in the center. As is shown however, the threaded shaft 10 is inserted through the central hole 12 of the base clamping member 11 and inserted through the entrance means 6. In this instance the long axis of the clamping member 11 is parallel to the long axis of the slot 2. However, upon insertion into the pocket portion 7 the threaded stud is turned and the clamping member 11 is aligned transversly to the long axis of the slot 2 as is shown in FIG. 3. The curved end portions 14 of the clamping member then register in a complimentary fashion with the arcuate surfaces of the front wall 4 of the pocket 7 of slot 2. By further turning of the threaded stud 10 the stud is left projecting through the entrance means 6 and the clamping plate 11 is firmly clamped against the lips 5 of the front wall 4 of the slot 2. Thereafter a mounting plate 24 as is shown in FIG. 1 may be placed over one or more of these projecting studs and a nut 29 tightened thereon to secure the light fixture into position. While the light fixture is shown as having two mounting members and mounting nuts 29, it is of course possible to use only one or even use more.

Figures 4, 5, 6, 7:
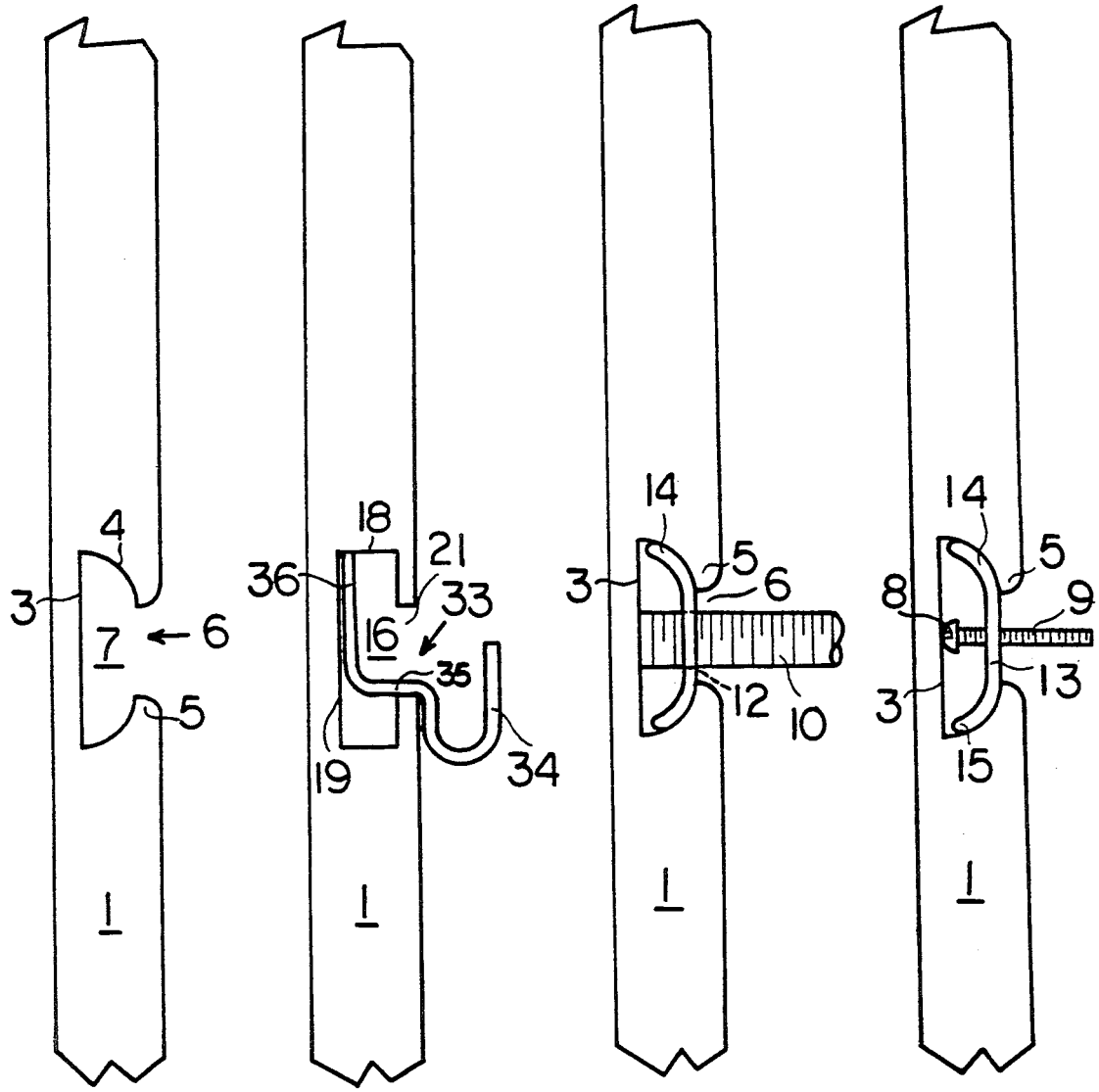
FIG. 4 is a side view of said mounting panel.
FIG. 5 is a side view of a conventional T-shaped slot of the prior art.
FIG. 6 is a side view of an embodiment of this invention illustrating a standard threaded stud utilized in the lighting industry.
FIG. 7 illustrates a screw having a shank of smaller diameter used with the clamping member of this invention.

FIG. 4 more clearly shows the interior dimensions and parts of the slot including the rear wall 3, the pocket member 7, the entrance means 6, the terminal lips 5 bounding the entrance to the slot 2 and the front wall portions 4 which curve forwardly in an arcuate position.

A typical conventional T-shaped slot 16 is shown in FIG. 5 in which a conventional gravity held clip has been installed. The gravity held clip 33 consists of a hook portion 34, a flat support portion 35 which fits over the lip 5 of the entrance means. A vertically projecting engagement piece 36 engages with the side wall 18 in the T-shaped slot. These clips can be used for supporting various members as has been illustrated in the MARLITE brochure, but are not suitable for vertically spaced grooves nor for display pieces of substantial weight or pieces which should not be moved around. This would of course include mirrors, lighting fixtures and easily breakable items which should not fall to the floor for fear of breakage.

FIG. 7 illustrates the use of a 8/32 screw with the screwhead 8 in engagement with the rear wall 3 of the slot 2 rather than the threaded stud 10 illustrated in FIG. 6. Again the head 8 of the screw is arranged so that the threaded shank 9 fits through the central threaded hole 12 in the bridge portion 13 of the brace clamping member 11. The provision of a smaller mounting member allows for the use of external commercial clips as will be described in more detail hereafter.

Figure 8:
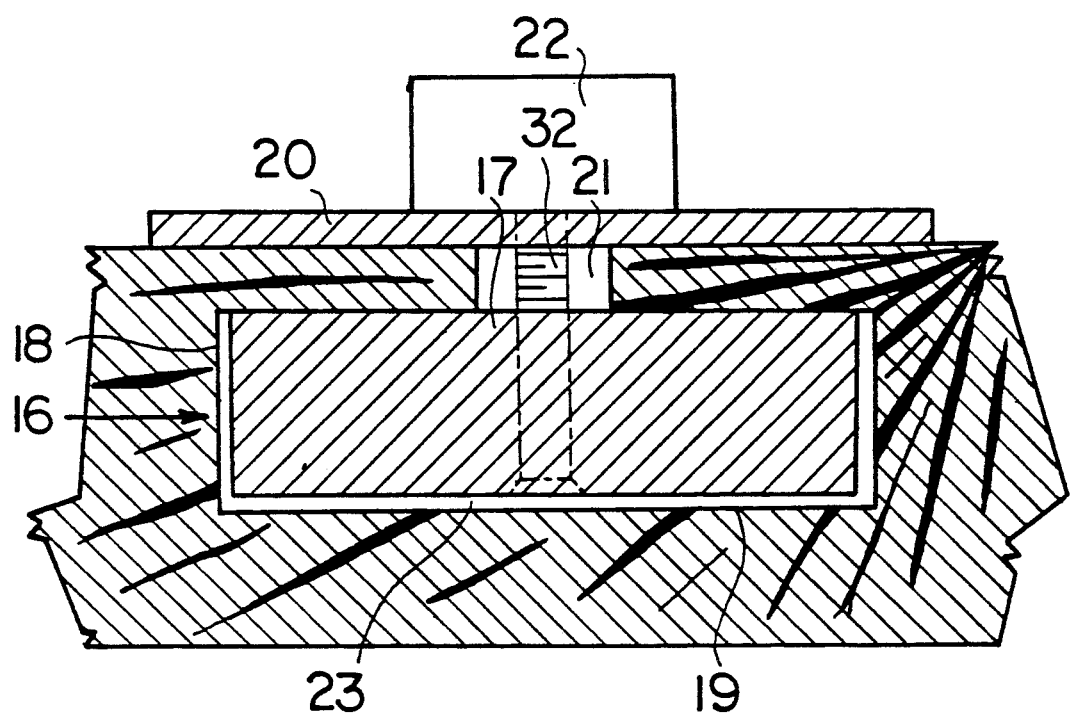
FIG. 8 illustrates a clamping member utilized in a conventional T-shaped slot of the prior art.
Figure 9:
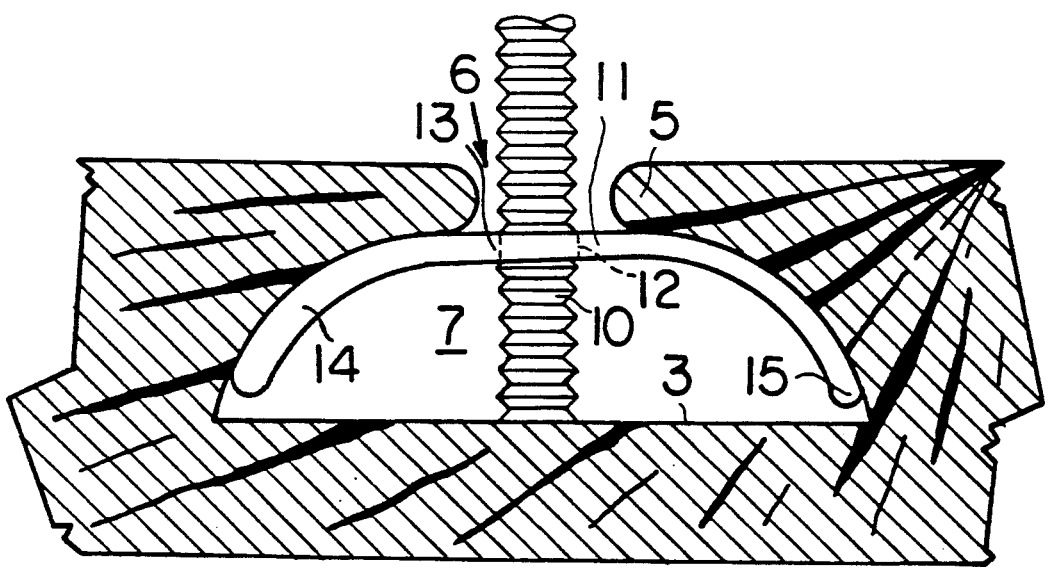
FIG. 9 illustrates a fragmentary enlarged view of the mounting assembly of this invention.

FIG. 8 illustrates the prior art and specifically the SPACEWALL mounting system disclosed and claimed by Parron, et. al. in U.S. Pat. No. 4,677,794. As previously mentioned, this arrangement was designed for use in vertically disposed slots. This involves the use of a T-shaped slot 16 with a keeper bar 17 which occupies most of the space of the pocket which is defined by side walls 18 and rear wall 19. Threaded shaft 32 fitted into the keeper member 17 is engaged on the exterior with turning knob 22. The threaded shaft 32 extends through the entrance 21 and through the force distribution plate 20 which is also threaded for engagement with the shaft 32. Therefore turning of the knob 22 and the threaded shaft 32 connected thereto pulls the keeper bar 17 into engagement with the front walls of the slot. A free space 23 is maintained between the keeper bar 17 and the rear wall 19 of the slot. It should be noted that while the shaft 32 may project through the bottom of the keeper bar 18, that in a preferred embodiment it is taught to be recessed so as not to extend beyond the bottom portion of the keeper bar. In contrast, the threaded shaft 10 of applicants is in engagement with the bottom wall 3 of the pocket 7 of the slot 2 and pushes the curved portions 14 of the mounting plate 11 into engagement with the curved portions of the front wall 4 of the slot. The threaded shaft 10 extends out through the entrance means 6 for engagement with an accessory clip or with a mounting plate of a lighting fixture or for a brace for mounting a shelf as will be understood. A force distribution plate 20 exterior of the surface of the wall board 1 is not required.

Figure 10:
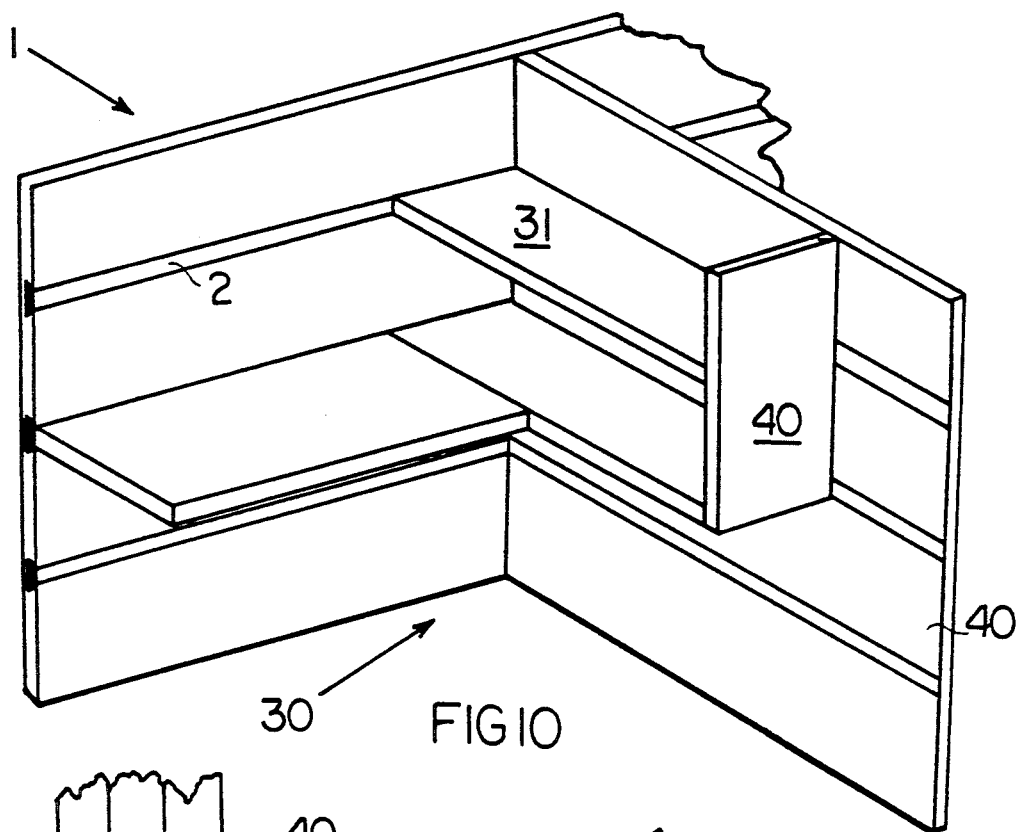
FIG. 10 is a perspective view of a work station including a novel assembly and use of the wall panel and mounting accessory of this invention.
Figure 11:
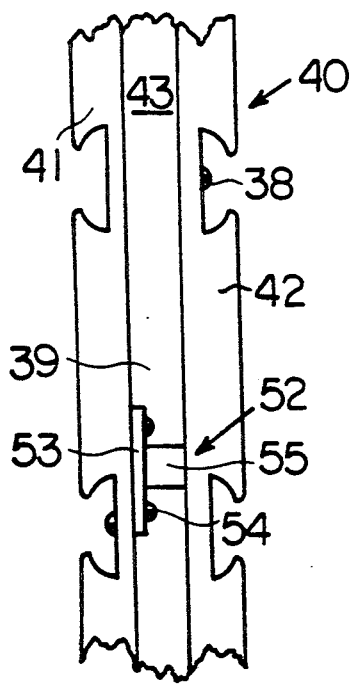
FIG. 11 is an end view illustrating the two panels of the panel mounting assembly, the intermediate spacing member and the second clip extending between the panels.
Figure 12:
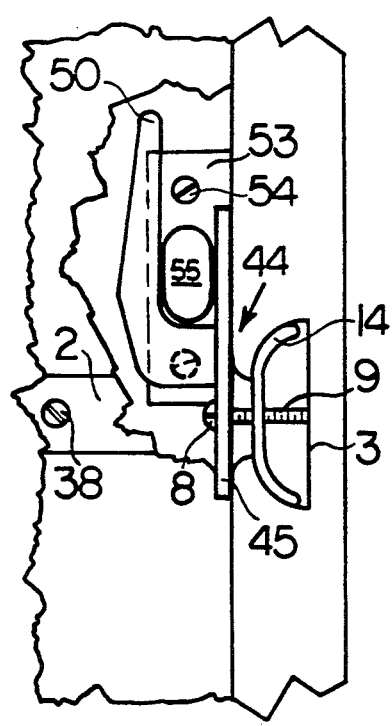
FIG. 12 is an enlarged fragmentary view illustrating in perspective the engagement of said panels through their external clips.

With reference to FIG. 10 a workstation 30 containing shelving 31 is shown which may be easily manufactured through the use of specialized mounting panels, assemblies 41 and accessory mounting clips 44 and 52 of this invention. To accomplish this it is necessary to produce a panel disposed at ninety degrees from the main panel so as to form a corner. A panel assembly 40 consists of a mounting panel 41, a mounting panel 42 and an intermediate spacing member 43. The spacing member 43 is connected to the mounting panels 41-42 by means of glue or by means of screws or other mechanical attachment means 38. A bridging clip 52 is installed between the backs of the panels 41-42. Bridging clip 52 has a base plate 53 which is attached by screws 54 into the panel 41. The tongue portion 55 of bridging clip 52 then extends across the intermediate spacing area 39 between the mounting panels 41-42 formed by intermediate spacing member 43. A base clamping member 11 is attached in one or more of the slots 2 of the mounting panel 1 and an accessory exterior clip 44 is attached thereto. The exterior clip 44 has a back plate 45 which fits over the projecting threaded shaft of screw 9 and is held in engagement by bolt head 8. The exterior clip contains a vertically upstanding engagement means 50 which engages with the tongue 55 of the bridging clip 52 as is shown clearly in FIG. 12. For stability, two or more of these clips may be used. In any case, one at the top and one at the bottom is desired. An additional divider is shown on one of these shelves. This is also attached in the same manner.

Through the use of these mounting panels and novel base clamping members with the projecting threaded stud, it is possible to produce partitions, work stations, cubicles and the like which may be equipped with shelves, literature holders and other devices which are well known in the art.

Figure 13:
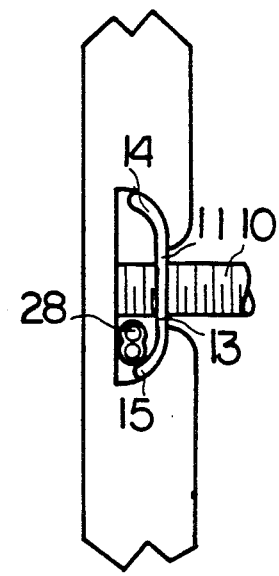
FIG. 13 is an end view of the mounting panel illustrating the disposition of electrical wires out of sight for use with a lighting fixture display.

As previously mentioned, the system was originally developed for display of lighting fixtures. One of the advantages of this system is shown in FIG. 13 in which the electric wire 28 is placed behind the base clamping plate member 11 and behind the raised curved portion of the front wall 4 of the pocket 7 of the slot 2 so as to be relatively invisible from the exterior. Therefore as is shown in FIG. 1, utilizing a switch 26 a series of lighting fixtures 25 can be electrically connected in series and controlled by a single switch 26.

Many modifications will occur to those skilled in the art. The description herein is meant to be illustrative and non-limiting except so as to be commensurate in scope with the appended claims.

We claim:

1. A mounting panel and mounting assembly secured thereto in which:
    A. said mounting panel comprises at least one elongated mounting slot having:
        1. an interior pocket portion bounded by a rear wall, a front wall and an entrance means bisecting said front wall,
        2. said front wall extending from the edges of said rear wall forwardly in an arcuate configuration and having terminal lip-like portions forming the edge of said entrance means;
    B. said mounting assembly comprising an arcuate base clamping member complementary to the arcuate configuration of said front wall of said pocket portion of said slot and having a width less than the width of the entrance means of said slot and a length greater than the width of said slot, and a threaded hole in the center portion of said clamping member;
    c. a threaded stud having one end fitted and threaded in said threaded hole of said clamping member for insertion of said clamping member into said pocket portion of said slot when said clamping member width is placed in alignment with the width of said entrance of said slot for selective movement of said stud in said pocket portion and against the rear wall of said pocket portion so that turning said threaded stud in said threaded hole and in abutment with said rear wall selectively moves said clamping member threaded thereon in and out of clamping engagement with the front wall of said pocket portion.

2. A combination as claimed in claim 1, further comprising a mounting plate for a light fixture which fits over said threaded stud projection out of said entrance means and a tightening nut for tightening said lighting fixture onto said stud.

3. A combination, as defined in claim 1, in which said entrance means is disposed in direct communication with said pocket portion of said slot, and in which the width of said pocket portion is of a greater dimension than the width of said entrance means.

4. A combination, as defined in claim 1, in which the entrance means of said slot includes a throat portion extending along the length thereof and is at least partially defined by the lip portions being spaced apart along a common distance along the length thereof, said common distance defining said width of said entrance means and the dimension thereof being a predetermined amount less than the width of said pocket portion.

5. A combination, as defined in claim 1, in which said panel has a plurality of mounting slots arranged in equidistant and parallel relation.

6. A combination, as defined in claim 5, in which said mounting slots are vertically arranged.

7. A combination, as defined in claim 6, in which said panel has mounting slots which are arranged in horizontal relation.

8. A method of installing a mounting accessory onto a wall which comprises providing a mounting panel having an elongated slot which includes;
    A. an internal pocket portion having a rear wall and a front wall and an entrance means bisecting said front wall; said front wall forming an arcuate surface projecting from the edges of the rear wall toward the front and terminating at terminal lips defining said entrance means;
    B. providing a base clamping member having an arcuate surface complementary to the arcuate surface of said front wall and containing a threaded hole in its center, said clamping member having a width less than said entrance means with the longitudinal axis of said clamping member alignable with the longitudinal axis of said slot;
    C. inserting and threading a threaded stud into the threaded hole of said clamping member and rotating said stud about its longitudinal axis with said width of said clamping member aligned with said entrance means and transverse to the longitudinal axis of said slot for insertion into said slot;
    D. turning said threaded stud about its longitudinal axis and tightening the threaded stud with said arcuate surface of said clamping member in mating engagement with said arcuate surface of said pocket portion until the end of the threaded stud contacts the rear wall of said pocket portion;
    E. further tightening the threaded stud into clamping engagement with said arcuate surface of said front wall of said pocket portion so that the threaded stud projects from the entrance means of said slot as a mounting assembly.

9. A workstation fabricated of slotted mounting panels which comprises;
    A. a mounting panel and mounting assembly secured thereto in which;
        1. said mounting panel comprises at least one elongated mounting slot having
            a. an interior pocket portion bounded by a rear wall, a front wall and an entrance means bisecting said front wall,
            b. said front wall extending from the edges of said rear wall forwardly in an arcuate configuration and having terminal lip-like portions forming the edges of said entrance means;
        2. said mounting assembly comprising an arcuate base clamping member complementary to the arcuate configuration of said front wall of said pocket portion of said slot and having a width less than the width of the entrance means of said slot and a length greater than the width of said slot and a threaded hole in the center portion of said clamping member;
        3. a threaded stud having one end fitted and threaded in said threaded hole of said clamping member for insertion of said clamping member into said pocket portion of said slot when said clamping member width is placed in alignment with the width of said entrance of said slot for selective movement of said stud into said pocket portion and against the rear wall of said pocket portion so that turning said threaded stud in said threaded hole and in abutment with said rear wall selectively moves said clamping member threaded thereon in and out of clamping engagement with the front wall of said pocket portion;

4. an external clip attached to said threaded stud and having a vertically projecting engagement portion;

B. a perpendicularly mounted panel assembly having elongated slots on each side which comprises;

1. a first slotted mounting panel 2. a second mounting panel 3. an intermediate spacing member holding said first and second mounting panels together in spaced and parallel relation;

4. a second clip extending between the first and second panels which engages with the vertically projecting engagement portion of said external clip.

10. A workstation, as defined in claim 9, in which said panel assembly comprises A. said first and second panel members adhesively secured to said intermediate spacing member.

11. A workstation, as defined in claim 9, in which said panel assembly comprises A. said first and second mounting panels secured together with said intermediate spacing member by mechanical attachment means.

12. A workstation, as defined in claim 9, in which said mounting panel assembly is perpendicularly mounted to said mounting panel at the top and at the bottom by external clips.

* * * * *